(12) United States Patent
Kummer et al.

(10) Patent No.: US 8,413,518 B2
(45) Date of Patent: Apr. 9, 2013

(54) SENSOR MEMBRANE

(75) Inventors: Adrian Kummer, Zurich (CH);
Christof Sonderegger, Neftenbach (CH)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 13/120,965

(22) PCT Filed: Oct. 5, 2009

(86) PCT No.: PCT/CH2009/000317
§ 371 (c)(1),
(2), (4) Date: Mar. 25, 2011

(87) PCT Pub. No.: WO2010/040239
PCT Pub. Date: Apr. 15, 2010

(65) Prior Publication Data
US 2011/0185817 A1    Aug. 4, 2011

(30) Foreign Application Priority Data

Oct. 9, 2008   (CH) ..................................... 1604/08

(51) Int. Cl.
*G01L 9/02*     (2006.01)
(52) U.S. Cl. ........................... 73/719; 73/715; 361/283.4
(58) Field of Classification Search ........................ None
See application file for complete search history.

(56) References Cited

U.S. PATENT DOCUMENTS

| | | | | |
|---|---|---|---|---|
| 4,299,129 A | * | 11/1981 | Ritzinger | ........................ 73/746 |
| 4,579,001 A | * | 4/1986 | Hosterman | ..................... 73/714 |
| 4,905,575 A | * | 3/1990 | Knecht et al. | ............. 92/103 SD |
| 5,177,579 A | * | 1/1993 | Jerman | ........................... 73/724 |
| 5,209,118 A | * | 5/1993 | Jerman | ........................... 73/715 |
| 5,461,208 A | * | 10/1995 | McKenna | ..................... 200/83 J |
| 6,843,132 B2 | * | 1/2005 | Mizuno et al. | .................. 73/715 |
| 8,011,252 B2 | * | 9/2011 | Watanabe et al. | ................ 73/717 |
| 8,297,124 B2 | * | 10/2012 | Watanabe et al. | ................ 73/715 |
| 2004/0231425 A1 | | 11/2004 | Mizuno et al. | |

FOREIGN PATENT DOCUMENTS

EP    0 649 011 A2    4/1995

OTHER PUBLICATIONS

English translation of International Preliminary Examination Report on Patentability, issued Apr. 12, 2011.
International Search Report on Patentability, issued Nov. 30, 2009.

* cited by examiner

*Primary Examiner* — Lisa Caputo
*Assistant Examiner* — Jermaine Jenkins
(74) *Attorney, Agent, or Firm* — Dority & Manning, P.A.

(57) ABSTRACT

A pressure or force sensor has a sensor housing, a measuring element in the housing, and a sensor membrane. The membrane is delimited by an inner edge and an outer edge, which is connected in a pressure-resistant manner to the sensor housing. The inner edge transitions in a pressure-resistant manner into a movable plunger, the travel of which can be detected by the measuring element. The membrane has one or more elastic regions between the outer edge and the inner edge, each region having a thinnest point, wherein the material thickness inside the elastic region increases steadily on both sides of this thinnest point. The cross-section of the membrane has an arched shape in each elastic region, and the arched shape has a convex outer and concave inner contour relative to the arch orientation.

20 Claims, 3 Drawing Sheets

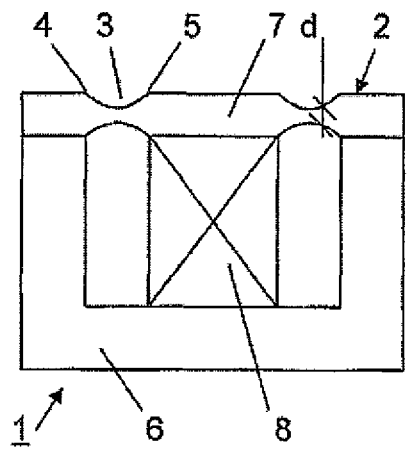
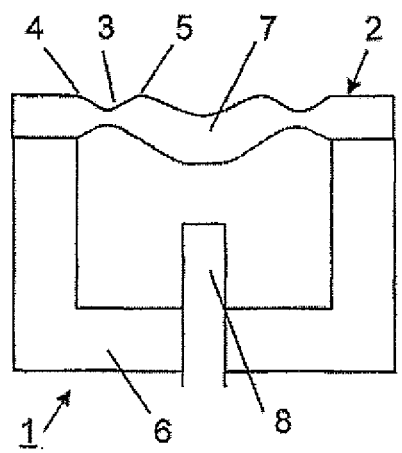
PRIOR ART
Fig. 1
PRIOR ART
Fig. 2
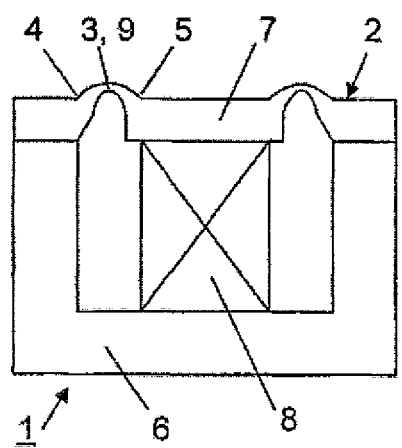
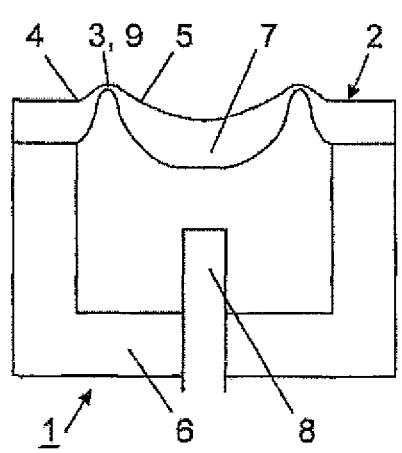
Fig. 3
Fig. 4

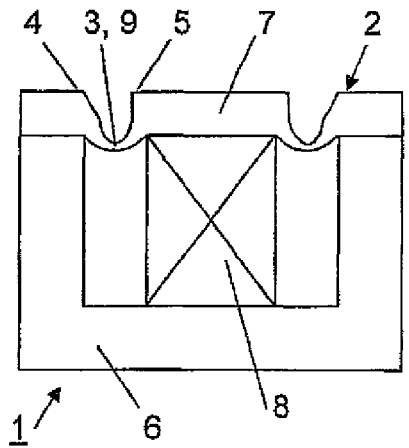
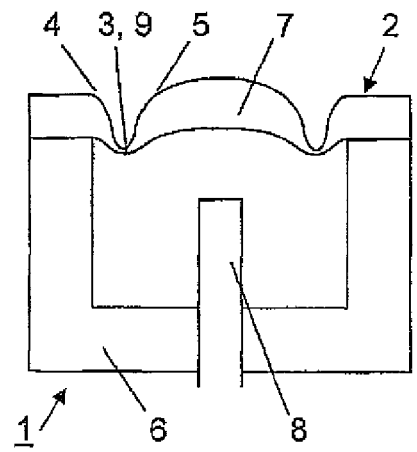
Fig. 5
Fig. 6
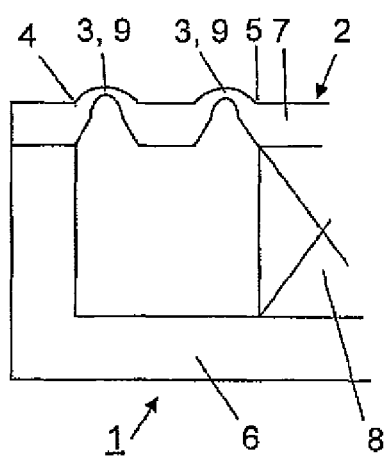
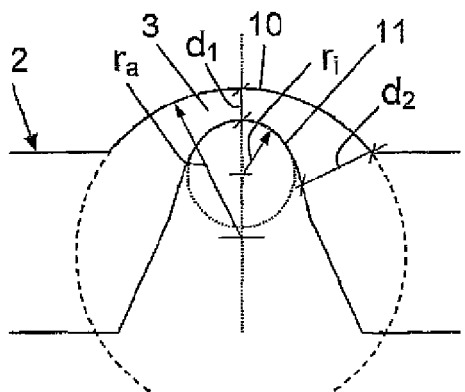
Fig. 7
Fig. 8

1

SENSOR MEMBRANE

CROSS-REFERENCE TO RELATED APPLICATIONS

This application claims priority to International Application Serial No. PCT/CH2009/000317 filed Oct. 5, 2009, which claims priority to Swiss Application No. CH 1604/08 filed Oct. 9, 2008.

TECHNICAL FIELD

The invention relates to a sensor membrane, in particular for pressure or force sensors, which is delimited by an outer edge and an inner edge, comprising at least one elastic region between the outer and the inner edge having a thinnest point.

BACKGROUND

Such membranes are used predominantly in pressure or force sensors. They seal the sensor interior with respect to the outside world and must withstand the pressure difference between both sides. Usually membranes are axisymmetrical. They comprise an elastic region which is delimited by an outer edge and an inner edge. The outer edge is connected in a pressure-resistant manner to a sensor housing whilst the inner edge transitions in a pressure-resistant manner into a movable plunger, the deflection of which can be detected by a measuring element in the sensor housing.

Fundamentally different types of membranes are used, for example, in drums, loudspeakers, microphones or in other technical application. These consist of flat or embossed tiles or films. They are usually not airtight and do not withstand pressures of several bar. They are frequently used in connection with sound waves and are therefore not exposed to any large pressure loadings. Such membranes having diameters of several centimeters or even decimeters must merely allow large deflections. This is achieved, for example, by a plurality of corrugations in the elastic region which lead to good elasticity. However, the material thickness in these regions is always constant.

Likewise, fundamentally different sensor membranes are known from oil-filled pressure sensors. Such membranes are frequently made of soft metals and have corrugations on their surface. Unlike the membranes described here, however, they do not need to withstand any pressure differences since a counter-pressure at the same level as the pressure produced always acts on the inner side of the membrane.

The material thickness of membranes of many pressure or force sensors has a minimum approximately centrally in the elastic region and increases steadily on both sides of the minimum. This type of membrane is known, for example, in CH 670310. The elastic region is concave on both sides when viewed in cross-section, other applications are plano-concave.

As a result of this reduced material thickness of the membrane, which is usually formed of metal, the membrane becomes elastic. The strength of the membrane diminishes with decreasing minimal material thickness whilst the elasticity increases in this case. The opposite is the case in the event of an increase of the minimal material thickness. As a result, load-bearing capacity and elasticity are coupled to one another. Therefore, for example, if the strength is to be increased by a greater material thickness, the elasticity of the membrane will be reduced at the same time, which leads to an increased installation sensitivity.

FIGS. 1 and 2 each show a schematic diagram of a sensor 1 according to the prior art in section. The sensor 1 comprises in each case a housing 6 in which a measuring element 8 is located. The housing 6 is sealed with a membrane 2 which is exposed to a force or a pressure from the outside during a measurement. The membrane 2 is usually round. At the centre it has a plunger 7 whose deflection can be detected by the measuring element 8.

In FIG. 1, the measuring element 8 is a body made of piezoelectric or piezoresistive material which is supported directly or indirectly at the back on a housing 6 and which can measure the force acting upon it from the membrane 2.

In FIG. 2, the measuring element 8 is an optical fibre which can measure the deflection of the membrane 2 whereby light is emitted from it towards the membrane 2 and reflected thereon, received by the fibre again and then evaluated in an evaluation system on the basis of the distance covered.

The membrane 2 comprises in each case an elastic region 3 which is delimited by an outer edge 4 and an inner edge 5. The outer edge 4 is connected in a pressure-resistant manner to the sensor housing 6 and the inner edge 5 transitions in a pressure-resistant manner into the movable plunger 7. During a measurement this elastic region 3 must withstand the loads acting from outside on the membrane 2. Accordingly, under the loading provided it must neither tear nor undergo plastic deformation and should also cause the lowest possible secondary force. The membrane 2 shown here is configured to be concave on both sides in the elastic region when viewed in cross section having a material thickness d which is minimal at the centre and increases on both sides. Plano-concave configurations are also known.

The plunger can alternatively also be configured to be annular, as in CH 670310 whereby the membrane has an elastic region respectively inside and outside the ring. In this case, the central region of the membrane is connected to the housing in a pressure-resistant manner in the same way as the outer edge.

Other membranes for pressure or force sensors are uniformly thin-walled in the elastic region with constant material thickness. At the same time, this thin region can be flat, curved or multiply curved. Such membranes are inexpensive and are used in many applications. However, since their quality relating to the relationship between strength and elasticity is much lower than the quality of membranes having a thinnest point from which the membrane thickness increases on both sides, such membranes are disregarded.

Pressure sensors having various membrane forms are presented in US 2004/0231425. The material thickness in these membranes is usually uniformly thick or has a maximum centrally in the elastic region. Such membranes are predominantly used in high-temperature applications. The aim of these membranes is to reduce measurement errors as a result of material elongations.

Another membrane structure is known from EP 649011 which has heat-compensating effects in pressure transducers. This is characterised by two elastic, plano-concave-shaped regions. Between these regions the membrane is configured to have uniform material thickness and is slightly set back with respect to the plunger.

Such membranes have proved to be weak when the membrane is exposed to high pressures or forces since there is a cavity behind the membrane in the sensor, which is not exposed to pressure. In high-pressure applications or exposure to high forces, rupture of the membranes therefore occurs repeatedly in such membranes.

DESCRIPTION OF THE INVENTION

It is the object of the present invention to describe a sensor membrane of a pressure or force sensor described initially, which has an increased strength with the same elasticity so that this can be used at higher differential pressures.

The object is achieved by construction of the described below.

The idea forming the basis of the invention consists in that the cross-section of the membrane in the elastic region forms an arcuate shape having a convex outer profile and a concave inner profile, relative to the orientation of the arc.

It has been found that this cross-sectional shape in the elastic region having identically directed arcs formed on both sides ensures a high loading capacity of the membrane. In addition, it is important for the high elasticity of the membrane that the material thickness in the elastic region continuously decreases steadily to a minimum and then increases continuously again.

A plurality of elastic regions can also be disposed between the outer and the inner edge. These are then configured to be the same thickness at the thinnest points so that their effect as a membrane also comes about. In order to withstand the increased load, all the elastic regions must then be correspondingly configured according to the invention as long as the thinnest points are configured to be the same thickness. If one elastic region were not configured in an arcuate shape in such a manner according to the invention, the membrane overall would be as weak as at this point and would already rupture at low load.

BRIEF DESCRIPTION OF THE DRAWINGS

The invention is explained in detail hereinafter with reference to the drawings. In the figures FIG. 1 shows a schematic diagram of a sensor according to the prior art with a pressure-sensitive measuring element in section;

FIG. 2 shows a schematic diagram of a sensor according to the prior art with an optical measuring element in section;

FIG. 3 shows a schematic diagram of a sensor according to the invention with a pressure-sensitive measuring element in section;

FIG. 4 shows a schematic diagram of a sensor according to the invention with an optical measuring element in section;

FIG. 5 shows a schematic diagram of an alternative sensor according to the invention with a pressure-sensitive measuring element in section;

FIG. 6 shows a schematic diagram of an alternative sensor according to the invention with an optical measuring element in section;

FIG. 7 shows a section of a schematic diagram of an alternative sensor according to the invention in section;

FIG. 8 shows a section of a membrane according to the invention in the elastic region in section;

DETAILED DESCRIPTION OF EXEMPLARY EMBODIMENTS

Figure 9:
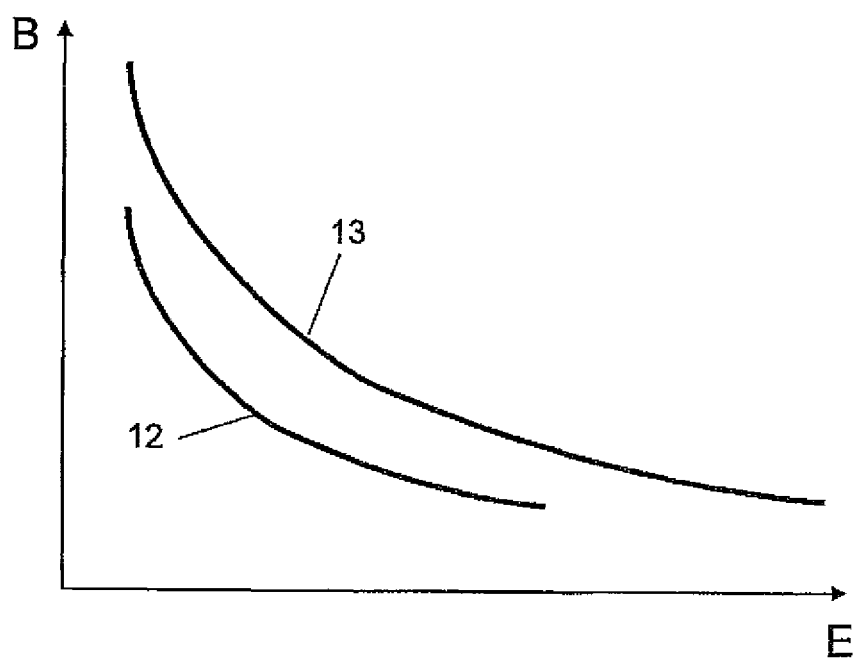
FIG. 9 shows the schematic relationship of load-bearing capacity and elasticity for various membrane shapes.

The reference numbers are retained in all the drawings.

FIG. 9 shows the relationship of load-bearing capacity B and elasticity E of a membrane 2. The limit of the load-bearing capacity can be determined by a rupture or a tear of the membrane and/or its plastic deformation. In each case this means a destruction of the sensor.

The curve behaviour 12 of a conventional membrane 2 according to the prior art shows the strong relationship between load-bearing capacity and elasticity. Depending on how thick the minimal thickness d1 of a membrane is configured to be, load-bearing capacity and elasticity increase or decrease inversely to one another. With the conventional technique it is not possible to depart from this line and thereby create better membranes having a higher load-bearing capacity B for the same elasticity E.

However, this is precisely the case if the membrane is configured according to the invention. Such a membrane 2 according to the invention has a higher load-bearing capacity B for the same elasticity E. Hence, the curve behaviour 13 which gives the relationship of elasticity E and load-bearing capacity B of a membrane 2 according to the invention is shifted towards a higher load-bearing capacity B.

Such membranes 2 according to the invention are shown in FIGS. 3-6. FIGS. 3 and 5 are designs with a piezoelectric or piezoresistive measurement element 8, and FIGS. 4 and 6 are designs with optical measuring elements 8. The basic structure comprising the housing 6 and the membrane 2 mounted tightly thereon further correspond to the conventional structure according to FIGS. 1 and 2.

The alternative configuration described with an annular plunger also applies for the configurations of the sensor membrane according to the invention.

In the membranes 2 according to the invention in FIGS. 3-6, the elastic region 3 at the centre again has a minimal material thickness d1 (FIG. 8) which becomes thicker towards both sides. Instead of the concave-concave contour in cross section, the contour of the cross section of the membrane 2 according to the invention is convex-concave and therefore describes an arcuate shape. As shown in the enlarged view of FIG. 8 for example, the arc has a convex outer contour 10 and a concave inner contour 11. The terms "inside" and "outside" again relate to the orientation of the arcuate shape and not to the outside or inside of the sensor housing. The arc therefore curves out from the plane of the membrane 2.

It should be noted here that concave-convex is not the same as convex-concave. In the case of not-claimed convex-concave contours, the smaller of the two radii of curvature r1 is on the inside of the arc which has the thinnest material thickness d1 approximately at the centre and becomes thicker towards the outside. In the case of concave-convex contours, the opposite is the case: the smaller of the two radii of curvature is on the outside of the arc. As a result the arc is thickest at the centre and becomes continuously thinner towards the outside. Such a contour is not advantageous for an elastic region 3 of a membrane 2 and is therefore not claimed.

FIG. 8 shows the elastic region 3 of a membrane 2 according to the invention. The thinnest material thickness d1 is at the centre of this region. Preferably one or both of the contours 10, 11 of the elastic region 3 is at least partially defined by circular arcs. In FIG. 8 the outside radius of the convex contour is given by $r_a$ and the inside radius of the concave contour is given by ri. In this case, it is clear that $r_a$ is significantly greater than $r_i$. Even if the outer and/or the inner contour describe no radii of circles, the same also applies for the respective radii of curvature at the thinnest point of the elastic region 3.

For example, the concave arc side 11 of the elastic region 3 has a radius of curvature $r_i$ between 0.1 and 2.5 mm, whereas the convex arc side 10 of the elastic region 3 has a radius of curvature $r_a$ between 0.5 and 5 mm.

The material thickness increases towards the edges of the membrane 2. According to the invention, the material thickness $d_2$ (FIG. 8 for example) at the edge of the arc 9 is at least 1.3 times as large as the central material thickness $d_1$. Very good results are achieved with material thicknesses $d_2$ at the edge of the arc 9 between 1.5 and 2 times as large as $d_1$. These relationships ensure a uniform stress field of a membrane 2 under a load without experiencing local stress maxima under load. As a result, the load-bearing capacity is increased for the same elasticity.

A membrane 2 according to the invention can therefore withstand a pressure difference of at least 10 bar even with small minimum material thicknesses $d_1$. Preferably however, membranes according to the invention are used for pressure sensors, in particular high-pressure sensors, for example in combustion chambers. Pressure loadings of 10,000 bar must be withstood for such applications.

Good results for such applications are achieved with membranes 2 whose thinnest material thickness $d_1$ of the elastic region 3 is between 0.02 and 1 mm.

Investigations have shown that it is unimportant for the elasticity of a membrane whether the arc 9 is directed outwards or inwards. Both arrangements have achieved good results. For the load-bearing capacity, the outwardly directed arc is more advantageous. On the other hand, for reasons of space a membrane having an inwardly-configured arc can be preferable.

Another possibility for improving a membrane 2 consists in arranging two elastic regions 3 according to the invention adjacently to one another, as shown in FIG. 7. Additional elastic regions 3 have achieved no improvement. Accordingly, explicitly precisely one or precisely two elastic regions 3 are recommended. A further elastic region only acts as such and is therefore only considered as an actual elastic region if its thinnest material thickness is of similar thickness to that of the first elastic region.

According to the invention, the membrane 2 is preferably made of metal, glass, ceramic, single crystal such as sapphire or quartz or of metallic glass.

REFERENCE LIST

1 Sensor
2 Sensor membrane, membrane
3 Elastic region
4 Outer edge
5 Inner edge
6 Sensor housing, housing
7 Plunger
8 Measuring element
9 Arc
10 Convex, outer contour of arc in cross section
11 Concave, inner contour of arc in cross section
12 Curve behaviour of a conventional membrane
13 Curve behaviour of a membrane according to the invention
B Load-bearing capacity
D Thinnest point of membrane
E Elasticity
d Material thickness of the membrane
$d_1$ Material thickness at the centre in the elastic region
$d_2$ Material thickness at the edge of the arc
$r_i$ Radius of the concave inner contour of the arc
$r_a$ Radius of the convex outer contour of the arc

The invention claimed is:

1. A sensor membrane for a pressure or force sensor having a sensor housing and a measuring element in the sensor housing, the membrane comprising: an outer edge and an inner edge, wherein the outer edge is configured to be connected in a pressure-resistant manner to the sensor housing, the inner edge transitions in a pressure-resistant manner into a movable plunger, the deflection of which can be detected by the measuring element in the sensor housing, one or more elastic regions between the outer edge and the inner edge each having a thinnest point, wherein the material thickness inside the elastic region increases steadily on both sides of this thinnest point, wherein the cross-section of the membrane in each elastic region has an arcuate shape having a convex outer contour and a concave inner contour, relative to the orientation of the arcuate shape.

2. The membrane according to claim 1, wherein one or both contours of the elastic region is defined at least in part by circular arcs.

3. The membrane according to claim 1, wherein the material thickness ($d_2$) at the edge of the arc is at least 1.3 times as great as that at the centre ($d_1$).

4. The membrane according to claim 1, wherein the membrane can withstand a pressure difference of at least 10 bar.

5. The membrane according to claim 1, wherein the concave arc side of the elastic region has a radius of curvature between 0.1 and 2.5 mm.

6. The membrane according to claim 1, wherein the convex arc side of the elastic region has a radius of curvature between 0.5 and 5 mm.

7. The membrane according to claim 1, wherein the thinnest material thickness ($d_1$) of the elastic region is between 0.02 and 1 mm.

8. The membrane according to claim 1, wherein the arc is directed outwards.

9. The membrane according to claim 1, wherein the arc (9) is directed inwards.

10. The membrane according to claim 1, wherein the membrane between the inner edge and the outer edge has precisely one or precisely two elastic regions having respectively one convex outer contour and one concave inner contour.

11. The membrane according to claim 1, wherein the membrane is made of metal, glass, ceramic, crystal or metallic glass.

12. A sensor, in particular a pressure or force sensor, comprising:
a sensor housing;
a measuring element disposed in the sensor housing; and
a sensor membrane which is delimited by an outer edge and an inner edge, wherein the outer edge is connected in a pressure-resistant manner to the sensor housing and the inner edge transitions in a pressure-resistant manner into a movable plunger that is disposed so that the deflection of the movable plunger can be detected by the measuring element in the sensor housing, the membrane further comprising at least one elastic region between the outer edge and the inner edge, each elastic region having a thinnest point (D), wherein the material thickness (d) inside each elastic region increases steadily on both sides of this thinnest point (D), wherein the cross-section of the membrane in each elastic region has an arcuate shape having a convex outer contour and a concave inner contour, relative to the orientation of the arcuate shape.

13. The sensor according to claim 12, wherein the sensor is a pressure sensor, in particular a high pressure sensor and/or a combustion chamber pressure sensor.

14. The sensor according to claim 12, wherein the sensor is one of the following types: a piezoelectric, piezoresistive or optical sensor.

15. The sensor according to claim 12, wherein at least one of the contours of the elastic region is defined at least in part by circular arcs.

16. The sensor according to claim 12, wherein the membrane can withstand a pressure difference of at least 10 bar.

17. The sensor according to claim 12, wherein the arc is directed outwards.

18. The sensor according to claim 12, wherein the arc is directed inwards.

19. The sensor according to claim 12, wherein the membrane between the inner edge and the outer edge has precisely one or precisely two elastic regions, each elastic region having respectively one convex outer contour and one concave inner contour.

20. The sensor according to claim 12, wherein the membrane is made of at least one of the following materials: metal, glass, metallic glass, ceramic or crystal.

\* \* \* \* \*